(12) United States Patent
Pazdziora et al.

(10) Patent No.: US 9,288,058 B2
(45) Date of Patent: Mar. 15, 2016

(54) EXECUTING COMPLIANCE VERIFICATION OR REMEDIATION SCRIPTS

(71) Applicant: Red Hat, Inc., Raleigh, NC (US)

(72) Inventors: Jan Pazdziora, Brno (CZ); Šimon Lukašik, Domasov (CZ)

(73) Assignee: Red Hat, Inc., Raleigh, NC (US)

( * ) Notice: Subject to any disclaimer, the term of this patent is extended or adjusted under 35 U.S.C. 154(b) by 77 days.

(21) Appl. No.: 14/016,588

(22) Filed: Sep. 3, 2013

(65) Prior Publication Data

US 2015/0067342 A1 Mar. 5, 2015

(51) Int. Cl.
- *H04L 9/32* (2006.01)
- *G06F 21/44* (2013.01)
- *G06F 21/57* (2013.01)

(52) U.S. Cl.
CPC .............. *H04L 9/3247* (2013.01); *G06F 21/44* (2013.01); *G06F 21/57* (2013.01)

(58) Field of Classification Search
CPC ....... H04L 63/12; H04L 63/123; G06F 21/00; G06F 21/10; G06F 21/12; G06F 21/121; G06F 21/128; G06F 21/30; G06F 21/44; G06F 21/445; G06F 21/50; G06F 21/51; G06F 21/57; G06F 21/577; G06F 21/60; G06F 21/606; G06F 21/62; G06F 21/6209; G06F 21/6218; G06F 15/177; G06F 2221/033
See application file for complete search history.

(56) References Cited

U.S. PATENT DOCUMENTS

| | | | |
|---|---|---|---|
| 6,470,450 B1 * | 10/2002 | Langford ............... | G06F 21/602 713/182 |
| 6,694,434 B1 * | 2/2004 | McGee et al. ................ | 713/189 |
| 7,818,427 B2 | 10/2010 | Kacin et al. | |
| 7,930,727 B1 * | 4/2011 | Baize ..................... | G06F 21/562 726/1 |
| 8,046,831 B2 | 10/2011 | Porter et al. | |
| 8,239,915 B1 * | 8/2012 | Satish ..................... | G06F 21/00 713/166 |
| 8,336,080 B2 | 12/2012 | Herrod | |
| 8,950,007 B1 * | 2/2015 | Teal ........................ | G06F 21/57 726/30 |
| 2002/0184533 A1 * | 12/2002 | Fox ........................ | H04L 63/102 726/1 |
| 2003/0191940 A1 * | 10/2003 | Sinha ..................... | G06F 21/64 713/176 |
| 2005/0198507 A1 * | 9/2005 | Brender et al. .............. | 713/170 |
| 2005/0198521 A1 * | 9/2005 | Nakazawa .................... | 713/194 |
| 2006/0021028 A1 | 1/2006 | Brunette et al. | |
| 2007/0083768 A1 * | 4/2007 | Isogai et al. .................. | 713/189 |
| 2007/0088635 A1 * | 4/2007 | King ...................... | G06Q 10/00 705/30 |
| 2007/0169041 A1 * | 7/2007 | Kojima et al. ................ | 717/148 |
| 2007/0261051 A1 * | 11/2007 | Porter .................... | G06F 21/554 717/174 |
| 2008/0127343 A1 | 5/2008 | Baker et al. | |
| 2009/0007264 A1 * | 1/2009 | Chatterjee et al. .............. | 726/22 |

(Continued)

OTHER PUBLICATIONS

"Computer Desktop Encyclopedia Terms: processor," http://lookup.computerlanguage.com, Feb. 25, 2014.*

Primary Examiner — Darren B Schwartz

(74) Attorney, Agent, or Firm — Lowenstein Sandler LLP

(57) ABSTRACT

Systems and methods for executing compliance verification or remediation scripts. An example method may comprise: identifying, by a computer system, a compliance script to be executed; determining a value of a cryptographic hash function of at least part of the identified compliance script; identifying, based on the value of the cryptographic hash function, an installation path of a corresponding digitally signed compliance script pre-installed on the computer system, the digitally signed compliance script associated with a security context; and executing, within the security context, the digitally signed compliance script.

20 Claims, 3 Drawing Sheets

(56) References Cited

U.S. PATENT DOCUMENTS

| | | | | |
|---|---|---|---|---|
| 2009/0113528 | A1* | 4/2009 | Ananda | H04L 63/0823 726/5 |
| 2013/0081101 | A1* | 3/2013 | Baer | G06F 21/577 726/1 |
| 2013/0326500 | A1* | 12/2013 | Park et al. | 717/177 |
| 2014/0089667 | A1* | 3/2014 | Arthur, Jr. | G06F 21/57 713/171 |
| 2014/0331277 | A1* | 11/2014 | Frascadore | H04L 63/20 726/1 |

* cited by examiner

EXECUTING COMPLIANCE VERIFICATION OR REMEDIATION SCRIPTS

TECHNICAL FIELD

The present disclosure is generally related to computer systems, and is more specifically related to systems and methods for executing compliance verification or remediation scripts by computer systems.

BACKGROUND

In response to a growing number of attacks against computer systems, owners and operators of such systems may introduce various security policies specifying requirements to configuration and operational aspects of computer systems. Examples of security policy requirements include configuration of anti-virus programs, firewall rules, anti-spam filter configuration, password strength rules, password maintenance rules, etc.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
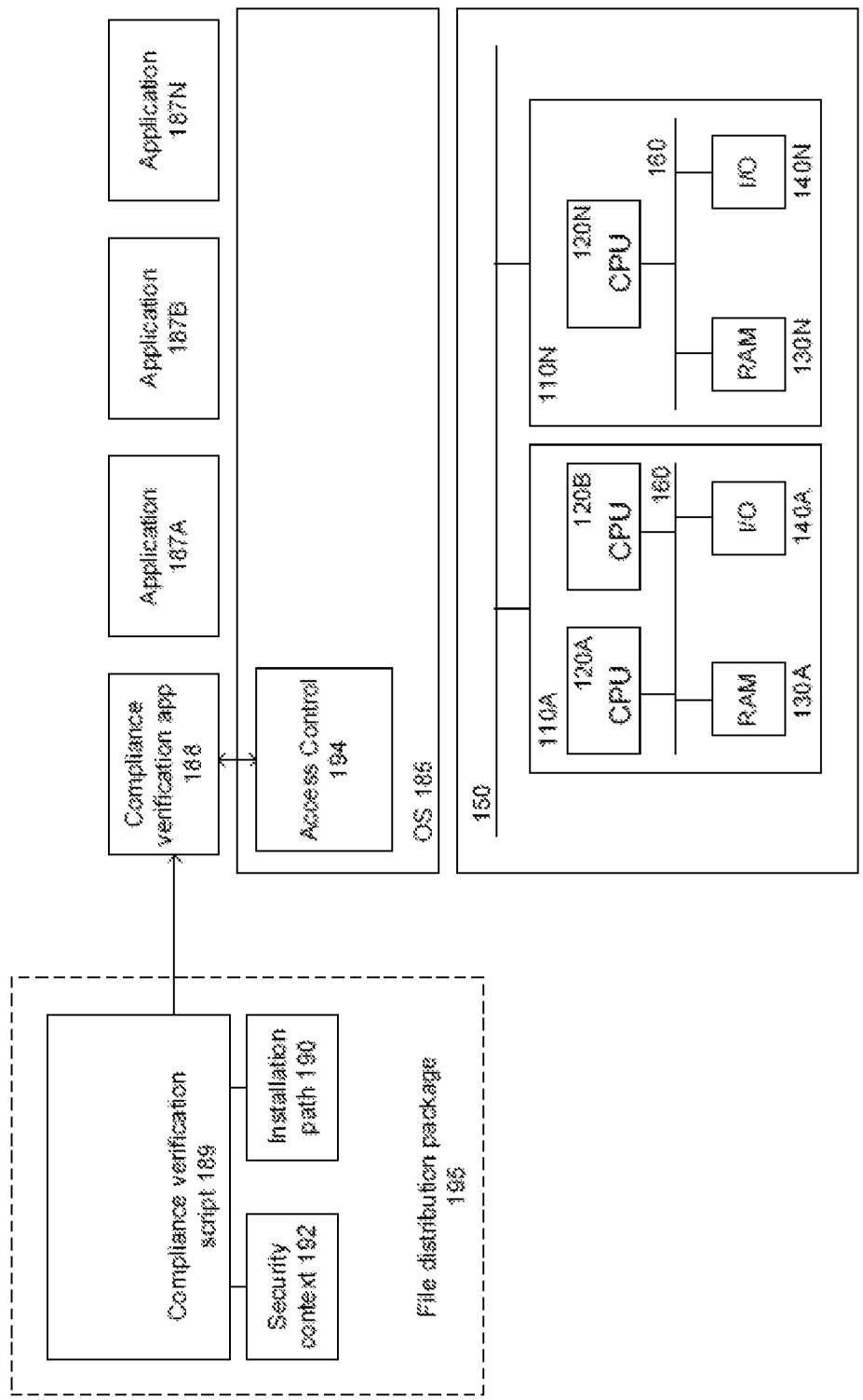
FIG. 1 schematically depicts component diagrams of an example computer system, in accordance with one or more aspects of the present disclosure.

Described herein are methods and systems for executing compliance verification or remediation scripts by computer systems. "Computer system" herein shall refer to a system comprising one or more processors, one or more memory devices, and one or more input/output (I/O) interfaces. In an illustrative example, a computer system may comprise one or more virtual machines executed on one or more physical servers interconnected by one or more networks.

A security policy to be enforced on a computer system may comprise numerous security requirements to the configuration and operational aspects of the computer system, including, e.g., software update schedules and procedures, authentication and authorization, user administration, etc. The system's compliance to the applicable security policies may be ascertained by running compliance verification scripts. A compliance verification script may, e.g., ascertain whether certain configuration and/or operations parameters of the computer system are within the respective allowed ranges. In certain implementations, a script may further specify remedial actions to be performed in order to remedy the deficiencies detected by the script. Thus, a "compliance script" herein shall refer to a "compliance verification and/or remediation script."

In certain implementations, a compliance script may be provided by an Extensible Configuration Checklist Description Format (XCCDF) document. In an illustrative example, an XCCDF script may be executed by a Security Content Automation Protocol (SCAP) auditing tool, such as OpenSCAP.

Since a compliance script may need to access an arbitrary set of objects in the system, the script may need to be executed by a process running with an extended set of privileges (e.g., root-level privileges). Hence, the compliance script may become a primary target of an attack by a malicious third party attempting to modify the compliance script in order to perform an unauthorized operation (such as executing unauthorized code or modifying run-time parameters of one or more processes running on the computer system).

To limit the security exposure which may be potentially created by executing a compliance script, while providing a fully operational environment for executing the script, the latter may be executed within one or more pre-defined security contexts associated with the script and enforced by a mandatory access control and/or a discretionary access control mechanism. To prevent a malicious party from tampering with the compliance script, the latter may be stored and/or distributed in a digitally signed file distribution package.

According to one or more aspects of the present disclosure, a computer system may receive a file distribution package comprising a plurality of digitally signed compliance scripts. The file distribution package may specify, for each script, an installation path which may be defined by a cryptographic hash function of at least part of the script contents. The file distribution package may also specify security settings (e.g., a security context) necessary for executing each script. The computer system may install the received compliance scripts according to the specified installation paths.

At the time of a security audit, an auditing tool may parse an audit policy file comprising references to one or more compliance scripts, to identify a compliance script to be executed. Then, a pre-defined cryptographic hash function of at least part of the contents of the identified script may be calculated, in order to identify the installation path of a corresponding pre-installed digitally signed compliance script. The auditing tool may then execute the digitally signed script using the security settings (e.g., a security context) applied when the digitally signed compliance script has been installed on the computer system.

Various aspects of the above referenced methods and systems are described in details herein below by way of examples, rather than by way of limitation.

FIG. 1 schematically depicts a high-level component diagram of an example computer system 100 in accordance with one or more aspects of the present disclosure. Computer system 100 may include one or more interconnected nodes 110A-110N. "Node" herein shall refer to a group of one or more processors and one or more associated memory devices locally accessible by the processors in the group. Each node 110 may in turn include one or more physical processors 120A-120N communicatively coupled to memory devices 130A-130N and input/output (I/O) devices 140A-140N.

"Processor" herein shall refer to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

"Memory device" herein shall refer to a volatile or non-volatile memory device, such as RAM, ROM, EEPROM, or any other device capable of storing data. "I/O device" herein shall refer to a device capable of providing an interface between one or more processor pins and an external device capable of inputting and/or outputting binary data.

Processors 120A-120N may be interconnected using a variety of techniques, ranging from a point-to-point processor interconnect, to a system area network 150, as shown in FIG. 1. Local connections within each node 110, including the connections between processor 120 and memory 130 and between processor 120 and I/O device 140 may be provided by one or more local buses 160 of suitable architecture, for example, PCI. One or more applications 187A-187N may be executed by computer system 100 under operating system 185.

In certain implementations, computer system 100 may execute a compliance application 188 which may be programmed to execute configurable compliance scripts. In an illustrative example, compliance application 188 may be provided by a Security Content Automation Protocol (SCAP)-compliant auditing tool. Compliance application 188 may be programmed to input, interpret and execute compliance scripts which may be created by a system administrator of an organizational entity and/or by a third-party service provider.

A compliance script may comprise one or more compliance rules. In an illustrative example, a compliance rule may comprise a conditional expression which may be represented by a system parameter, one or more values of the system parameter, and a logical relation between the actual and specified values of the system parameter.

In certain implementations, a compliance script may further specify one or more remedial actions to be performed depending on the result of evaluating a compliance rule. In an illustrative example, responsive to detecting a failed compliance rule, compliance application 188 may modify the values of one or more system parameters (e.g., disable user login for a user who has failed to change the password within the prescribed period). In another illustrative example, responsive to detecting a failed compliance rule, compliance application 188 may present an error message to an operator and/or appended the error message to a log file. In another illustrative example, responsive to detecting a failed compliance rule, compliance application 188 may terminate one or more processes that have been determined to violate one or more compliance rules. In another illustrative example, responsive to detecting a failed compliance rule, compliance application 188 may execute one or more processes with pre-defined sets of parameters (e.g., an antivirus scanning program to scan a particular set of files).

In certain implementations, a security compliance script may be provided by an Extensible Configuration Checklist Description Format (XCCDF) document. An XCCDF document may represent a structured collection of compliance rules for one or more target computer systems. XCCDF documents are expressed in XML, and may be validated with an XML Schema-validating parser. In an illustrative example, an XCCDF script may be executed by a Security Content Automation Protocol (SCAP) auditing tool, such as OpenSCAP.

As noted herein above, a compliance script may need to access an arbitrary set of objects in the system. Hence the script may need to be executed by a process running with an extended set of privileges (e.g., root-level privileges), and thus may become a primary target of an attack by a malicious third party attempting to modify the script in order to perform an unauthorized operation (such as executing unauthorized code or modifying run-time parameters of one or more processes running on the computer system). To limit the security exposure which may be potentially created by executing a compliance script, while providing a fully operational environment for executing the script, in accordance with one or more aspects of the present disclosure, a compliance script may be executed within one or more pre-defined security contexts specified by the script and enforced by a discretionary access control or mandatory access control mechanism.

A discretionary access control mechanism may provide means for restricting access to objects based on the identity of subjects and/or groups to which the subjects belong. The controls are discretionary in the sense that a subject with a certain access permission may be capable of passing that permission (perhaps indirectly) on to any other subject (unless restrained by mandatory access control).

A mandatory access control mechanism may confine subjects (such as users and/or processes) to the minimum level of privileges needed to perform requested operations on objects (files, sockets, memory, etc.). Each of the subjects and objects may be associated with one or more security attributes that can be interrogated by the mandatory access control mechanism to ascertain whether the requested object access operation may be performed by the requesting subject. A "security attribute" herein shall refer to a parameter of a subject or an object. In an illustrative example, one or more identity attributes, such as a user name, may identify a subject.

In certain implementations, the mandatory access control mechanism may operate independently of conventional access control mechanisms which may be built-in into various operating systems. In an illustrative example, a mandatory access control mechanism may be provided by SELinux package comprising several kernel modules.

In certain implementations, a subject and/or an object may be associated with a security context identifier, which may be used to formulate security rules. A security context identifier may be provided by a variable-length string which may be defined in the security policy and may be associated with a security context. The latter may be defined, e.g., by a role, user name, and a domain (or object type). One or more subjects may be allowed to access one or more objects by an allow rule.

According to one or more aspects of the present disclosure, a computer system may prepare for performing security audits by pre-installing compliance scripts provided by a trusted source (e.g., a security department within an organization or a third party security service provider). As schematically illustrated by FIG. 1, one or more compliance scripts 189 may be packaged into a file distribution package 195. In an illustrative example, a file distribution package may be provided by a Red Hat Package Manager (RPM) file.

In certain implementations, file distribution package 195 may comprise a package label, one or more executable files (e.g., compliance script files 189), and/or one or more source files. The package label may comprise a name of the software package being distributed, the version number of the software, and the architecture for which the package was built.

The file distribution package may specify, for each compliance script, an installation path 190 which may be defined based on a cryptographic hash function of at least part of the script contents. The file distribution package may also specify security settings (e.g., a security context 192) necessary for executing each script.

In certain implementations, the file distribution package may be electronically signed (e.g., using strong cryptography mechanisms, such as Secure Hash Algorithms defined by RFC-6234 by the Network Working Group of Internet Engineering Task Force).

At the time of a security audit, an auditing tool may identify one or more compliance scripts to be executed (e.g., by parsing an audit policy file comprising identifiers of one or more compliance scripts). However, instead of executing the compliance script referenced by the audit policy file, a corresponding pre-installed digitally signed compliance script may be executed. The auditing tool may calculate a pre-defined cryptographic hash function of at least part of the contents of the compliance script referenced by the audit policy file. The hash function may produce at least part of the installation path of the corresponding pre-installed digitally signed compliance script. The auditing tool may then execute the digitally signed script using the security settings (e.g., a security context) applied when the digitally signed compliance script has been installed on the computer system.

In certain implementations, if the pre-installed digitally signed compliance script corresponding to a compliance script referenced by a security audit policy file could not be found in the specified file system location, the audit tool may attempt to execute the compliance script referenced by the security audit policy file. In an illustrative example, executing the compliance script referenced by the security audit policy file (rather than a corresponding digitally signed script) may fail, since the access control mechanism would prevent the compliance script from accessing one or more objects necessary for normal script execution.

Figure 2:
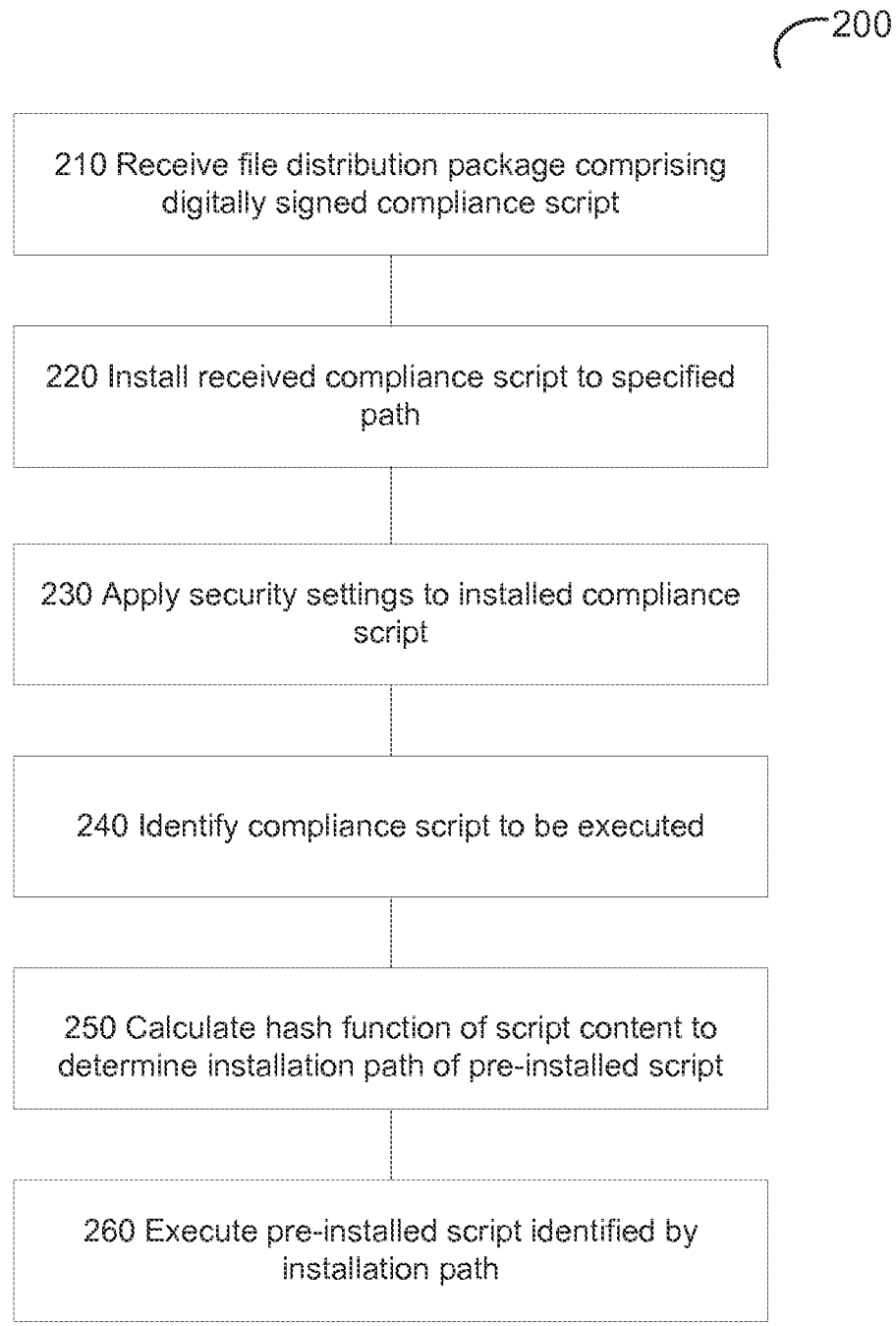
FIG. 2 depicts a flow diagram of an example method for executing compliance scripts by computer systems, in accordance with one or more aspects of the present disclosure.

FIG. 2 depicts a flow diagram of an example method 200 for executing compliance scripts by computer systems. The method 200 may be performed by a computer system that may comprise hardware (e.g., circuitry, dedicated logic, and/or programmable logic), software (e.g., instructions executable on a computer system to perform hardware simulation), or a combination thereof. In an illustrative example, method 200 may be performed by compliance application 188 of FIG. 1. Method 200 and/or each of its individual functions, routines, subroutines, or operations may be performed by one or more processors of the computer system executing the method.

At block 210, a computer system may receive a file distribution package comprising one or more compliance scripts. The file distribution package may specify, for each script, an installation path which may be defined by a cryptographic hash function of at least part of the script contents, as described in more details herein above. The file distribution package may also specify security settings (e.g., a security context) necessary for executing each script, as described in more details herein above. Responsive to receiving the file distribution package, the computer system may validate the package integrity in accordance with the digital signature algorithm used to digitally sign the package.

At block 220, the computer system may install the received compliance scripts in accordance with the installation paths specified by the file distribution package.

At block 230, the computer system may apply to the installed compliance scripts the security settings specified by the file distribution package (e.g., the security context identifiers to be used by a mandatory access control mechanism), as described in more details herein above.

At block 240, at the time of a security audit, the computer system may identify a compliance script to be executed, e.g., by parsing an audit policy file, as described in more details herein above.

At block 250, the computer system may calculated a pre-defined cryptographic hash function of at least part of the contents of the identified script, in order to identify the installation path of a pre-installed script corresponding to the script to be executed.

At block 260, the computer system may execute the pre-installed script identified by the installation path. The auditing tool may then execute the digitally signed script using the security settings (e.g., a security context) applied when the digitally signed compliance script has been installed on the computer system.

Upon completing the operations referenced by block 260, the method may terminate.

Figure 3:
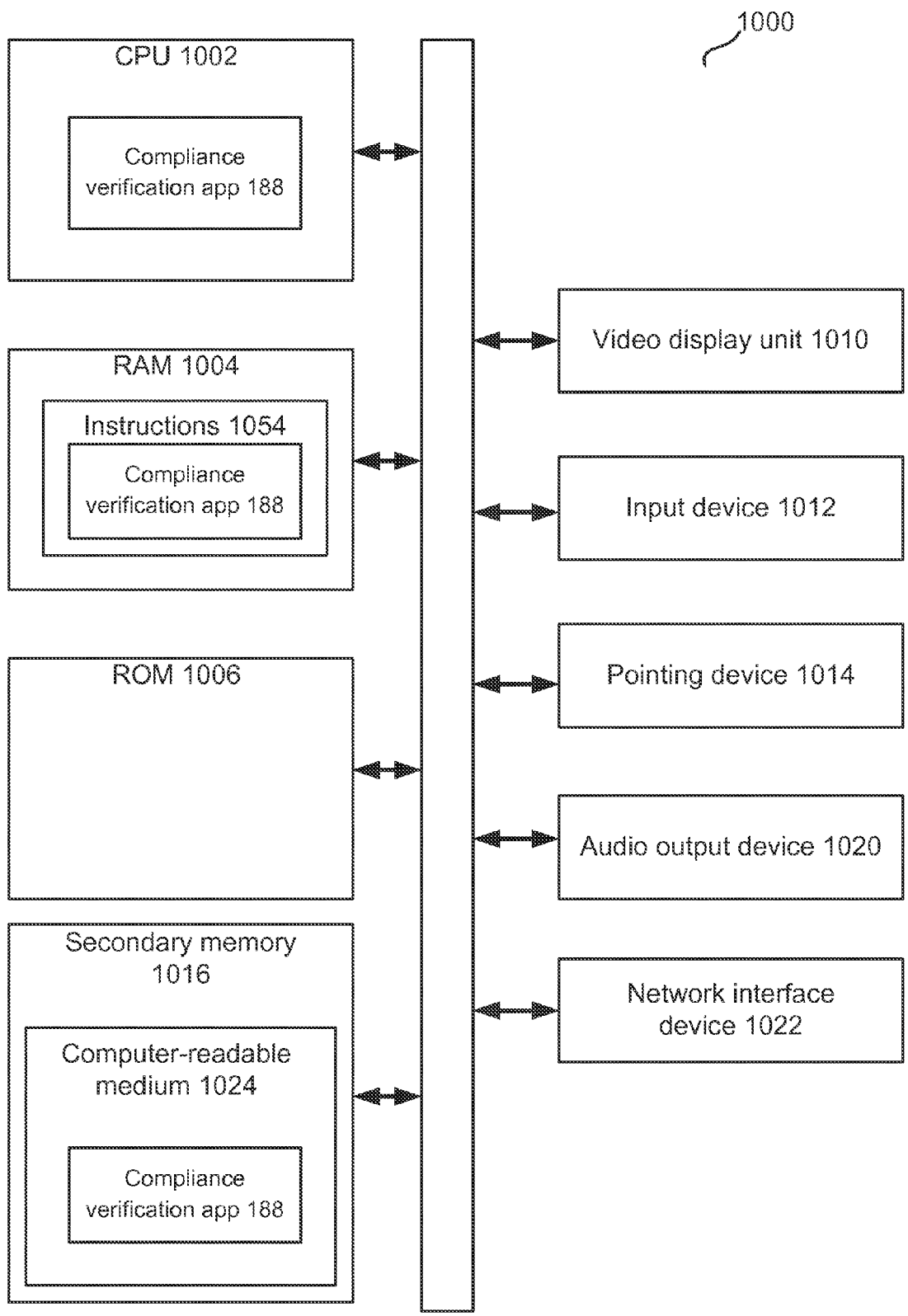
FIG. 3 depicts an illustrative computer system operating in accordance with examples of the present disclosure.

FIG. 3 depicts an illustrative computer system operating in accordance with examples of the present disclosure. In one example, computer system 1000 may correspond to the computer system 100 of FIG. 1.

In one example, the computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a physical processor 1002, a volatile memory 1004 (e.g., random access memory (RAM)), a non-volatile memory 1006 (e.g., read-only memory (ROM) or electrically-erasable programmable ROM (EEPROM)), and a storage memory 1016 (e.g., a data storage device), which may communicate with each other via a bus 1008.

The processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

The computer system 1000 may further include a network interface device 1022. The computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

The secondary memory 1016 may include a tangible computer-readable storage medium 1024 on which may be stored instructions 1054 encoding compliance application 188 of FIG. 1. The instructions 1054 may also reside, completely or partially, within the main memory 1004 and/or within the processor 1002 during execution thereof by the computer system 1000, hence, the main memory 1004 and the processor 1002 may also constitute machine-readable storage media.

While the computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 200 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and embodiments, it will be recognized that the present disclosure is not limited to the examples and embodiments described. The scope of the disclosure should be determined with reference to the following claims, along with the full scope of equivalents to which the claims are entitled.

The invention claimed is:

1. A method, comprising:
   identifying, by a hardware processor, a first compliance script;
   determining a value of a cryptographic hash function of at least part of the first compliance script;
   determining, using the value of the cryptographic hash function, an installation path of a second compliance script;
   identifying a security context associated with the second compliance script at installation time; and
   executing, by the hardware processor, the second compliance script within the security context to determine whether a parameter of a computer system is within an allowed range.

2. The method of claim 1, wherein the second compliance script comprises at least one of: a compliance verification rule or a compliance remediation rule.

3. The method of claim 1, wherein the second compliance script is conformant to Extensible Configuration Checklist Description (XCCDF) format.

4. The method of claim 1, wherein identifying the first compliance script comprises parsing an audit policy file.

5. The method of claim 1, wherein executing the digitally signed compliance script comprises invoking at least one of: a mandatory access control function or a discretionary access control function.

6. The method of claim 1, wherein executing the second compliance script comprises evaluating a compliance rule, the compliance rule comprising an identifier of a system parameter, a specified value of the system parameter, and a logical relationship between an actual value of the system parameter and the specified value of the system parameter.

7. The method of claim 1, wherein executing the second compliance script comprises, responsive to determining that a compliance rule is violated, modifying the actual value of the system parameter.

8. The method of claim 1, wherein executing the second compliance script comprises, responsive to determining that a compliance rule is violated, terminating a process associated with the system parameter.

9. The method of claim 1, wherein executing the second compliance script comprises, responsive to determining that a compliance rule is violated, executing a defined process.

10. The method of claim 1, wherein identifying a security context associated with the first compliance script comprises parsing an audit policy file.

11. A computer system, comprising:
    a memory; and
    a hardware processor, operatively coupled to the memory, to:
       identify a first compliance script;
       determine a value of a cryptographic hash function of at least part of the first compliance script;
       determine, using the value of the cryptographic hash function, an installation path of a second compliance script;
       identify a security context associated with the second compliance script at installation time; and
       execute the second compliance script within the security context to determine whether a parameter of the computer system is within an allowed range.

12. The system of claim 11, wherein the second compliance script comprises at least one of: a compliance verification rule or a compliance remediation rule.

13. The system of claim 11, wherein the second compliance script is conformant to Extensible Configuration Checklist Description (XCCDF) format.

14. The system of claim 11, wherein to execute the second compliance script, the hardware processor is further to invoke at least one of: a mandatory access control function or a discretionary access control function.

15. The system of claim 11, wherein to identify the first compliance script, the hardware processor is further to parse an audit policy file comprising an identifier of the compliance script.

16. A non-transitory computer-readable storage medium comprising executable instructions to cause a hardware processor to:
- identify, by the hardware processor, a first compliance script;
- determine a value of a cryptographic hash function of at least part of the first compliance script;
- determine, using the value of the cryptographic hash function, an installation path of a second compliance script;
- identify a security context associated with the second compliance script at installation time; and
- execute, by the hardware processor, the second compliance script within the security context to determine whether a parameter of a computer system is within an allowed range.

17. The non-transitory computer-readable storage medium of claim 16, wherein the second compliance script comprises at least one of: a compliance verification rule or a compliance remediation rule.

18. The non-transitory computer-readable storage medium of claim 16, wherein executable instructions to execute the second compliance script comprise executable instruction to invoke at least one of: a mandatory access control function or a discretionary access control function.

19. The non-transitory computer-readable storage medium of claim 16, wherein the second compliance script is conformant to Extensible Configuration Checklist Description (XCCDF) format.

20. The non-transitory computer-readable storage medium of claim 16, wherein executable instructions causing the hardware processor to identify the first compliance script further comprise executable instructions causing the hardware processor to parse an audit policy file.

* * * * *